(12) United States Patent
Yu et al.

(10) Patent No.: US 11,250,434 B2
(45) Date of Patent: Feb. 15, 2022

(54) PAYMENT METHOD AND DEVICE

(71) Applicant: CHINA UNIONPAY CO., LTD., Shanghai (CN)

(72) Inventors: Weiqi Yu, Shanghai (CN); Sishuang Wan, Shanghai (CN); Limin Zhang, Shanghai (CN); Jinzhi Hua, Shanghai (CN); Shuo He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 175 days.

(21) Appl. No.: 16/461,683

(22) PCT Filed: Oct. 20, 2017

(86) PCT No.: PCT/CN2017/107129
§ 371 (c)(1),
(2) Date: May 16, 2019

(87) PCT Pub. No.: WO2018/095171
PCT Pub. Date: May 31, 2018

(65) Prior Publication Data
US 2019/0354983 A1    Nov. 21, 2019

(30) Foreign Application Priority Data
Nov. 22, 2016    (CN) .......................... 201611041743.9

(51) Int. Cl.
*G06Q 20/40*    (2012.01)
*G06Q 20/32*    (2012.01)
(52) U.S. Cl.
CPC ......... *G06Q 20/4016* (2013.01); *G06Q 20/32* (2013.01)
(58) Field of Classification Search
USPC .......................................................... 705/44
See application file for complete search history.

(56) References Cited

U.S. PATENT DOCUMENTS

2015/0121486 A1*    4/2015    Ye .......................... H04W 4/80
726/5

FOREIGN PATENT DOCUMENTS

CN    102664903 A    9/2012
CN    104579665 A    4/2015
(Continued)

OTHER PUBLICATIONS

The World Intellecutal Property Organization (WIPO) International Search Report for PCT/CN2017/107129 dated Jan. 19, 2018 6 pages.

*Primary Examiner* — Jason Borlinghaus
*Assistant Examiner* — Ambreen A Alladin
(74) *Attorney, Agent, or Firm* — Anova Law Group, PLLC

(57) ABSTRACT

A payment method and device are provided. The payment method includes: a server receives a passwordless payment request transmitted from a terminal, and receives a current neighboring apparatus identifier search-detected and reported by the terminal; the server performs, according to the current neighboring apparatus identifier, and a corresponding relationship of a preconfigured terminal and a neighboring apparatus identifier, risk evaluation on the terminal, to obtain an overall risk evaluation score; and the server determines, according to the overall risk evaluation score, a passwordless payment strategy corresponding to the passwordless payment request. The server performs the risk evaluation on the current surrounding environment of the terminal to obtain the overall risk evaluation score, and then determine, according to the overall risk evaluation score, security of the current surrounding environment of the terminal, and determine the corresponding passwordless payment strategy corresponding to the passwordless request.

7 Claims, 4 Drawing Sheets

(56) References Cited

FOREIGN PATENT DOCUMENTS

| | | | |
|---|---|---|---|
| CN | 104601324 A | | 5/2015 |
| CN | 104767717 A | * | 7/2015 |
| CN | 104767717 A | | 7/2015 |
| CN | 105306204 A | | 2/2016 |
| CN | 105592002 A | * | 5/2016 |
| CN | 105592002 A | | 5/2016 |
| CN | 106779701 A | | 5/2017 |

* cited by examiner

PAYMENT METHOD AND DEVICE

CROSS-REFERENCES TO RELATED APPLICATIONS

This application is a national phase entry under 35 U.S.C § 371 of International Application No. PCT/CN2017/107129, filed on Oct. 20, 2017, which claims priority to Chinese Patent Application No. 201611041743.9, filed Nov. 22, 2016, all of which is hereby incorporated by reference in its entirety.

FIELD OF THE DISCLOSURE

The embodiments of the present disclosure relate to the technical field of payment and, in particular, to a payment method and device.

BACKGROUND

With the rapid development of computer network technology and e-commerce, online transactions have been used as a common way for business. The online transactions are fast and efficient and have been recognized by a growing number of people. The payment methods for online transactions are becoming well known to users. In order to ensure the security of payment processes, users are generally required to set up passwords.

Since the typical payment methods in the related art all require an account and a password to verify the user's identity for the payment, troublesome payment processes and large security risk may be caused, thereby bringing the users with poor experiences.

As such, there is an urgent need for a payment scheme with improved convenience and security of passwordless payment.

BRIEF SUMMARY OF THE DISCLOSURE

One embodiment of the present disclosure provides a payment method, including: receiving, by a server, a passwordless payment request transmitted by a terminal, and receiving a current neighboring apparatus identifier search-detected and reported by the terminal; performing, by the server, a risk evaluation on a current environment of the terminal, according to the current neighboring apparatus identifier and a preset corresponding relationship between the terminal and a neighboring apparatus identifier, to obtain an overall risk evaluation score; and determining, by the server, a passwordless payment strategy corresponding to the passwordless payment request according to the overall risk evaluation score.

In the embodiment of the present disclosure, at first, the server performs, according to the received current neighboring apparatus identifier and the preset corresponding relationship between the terminal and the neighboring apparatus identifier, the risk evaluation on the current environment of the terminal, to obtain the overall risk evaluation score, and then determines, according to the overall risk evaluation score, security of the current environment of the terminal, to determine the passwordless payment strategy corresponding to the passwordless payment request, thereby improving the convenience and security of passwordless payment.

Another embodiment of the present disclosure provides an electronic device, including: a processor, a memory, a transceiver, and a communication interface; where, the processor, the memory, the transceiver and the communication interface are interconnected by a bus; the processor is configured to read a program stored in the memory and execute following operations: performing a risk evaluation on the current environment of a terminal, according to a current neighboring apparatus identifier, and a preset corresponding relationship between the terminal and a neighboring apparatus identifier, to obtain an overall risk evaluation score; and determining a passwordless payment strategy corresponding to a passwordless payment request, according to the overall risk evaluation score; the memory is configured to store one or more executable programs and store data used by the processor during performing the operations; and the transceiver is configured to receive the passwordless payment request transmitted by the terminal, and receive the current neighboring apparatus identifier detected and reported by the terminal.

In a third aspect, the embodiment of the present disclosure provides a server, for implementing the method in the first aspect, including relevant function modules for implementing the operations in the method respectively.

In a fourth aspect, the embodiment of the present disclosure provides a non-transitory computer-readable storage medium for storing instructions that enable a computer to execute the method in the first aspect or any possible implementation of the first aspect when running on the computer.

In a fifth aspect, the embodiment of the present disclosure provides a computer program product containing instructions that enable a computer to execute the method in the first aspect or any possible implementation of the first aspect when running on the computer.

BRIEF DESCRIPTION OF THE DRAWINGS

In order to more clearly illustrate the technical scheme in the embodiment of the present disclosure, the accompanying drawings to be used in the description of the embodiment will be briefly described below.

DETAILED DESCRIPTION

In order to make a purpose, technical scheme and advantage of the embodiments of the present disclosure clearer, the technical scheme thereof will be further described clearly and completely in detail below with reference to the accompanying drawings. It is apparent that the embodiments described are only part of the embodiments of the present disclosure, not all of them. Based on the embodiments of the present disclosure, all other embodiments acquired by those of ordinary skilled in the art without creative labor shall fall within the scope of protection of the present disclosure.

The embodiment of the present disclosure provides a payment method and device for improving the convenience and security of passwordless payment.

Figure 1:
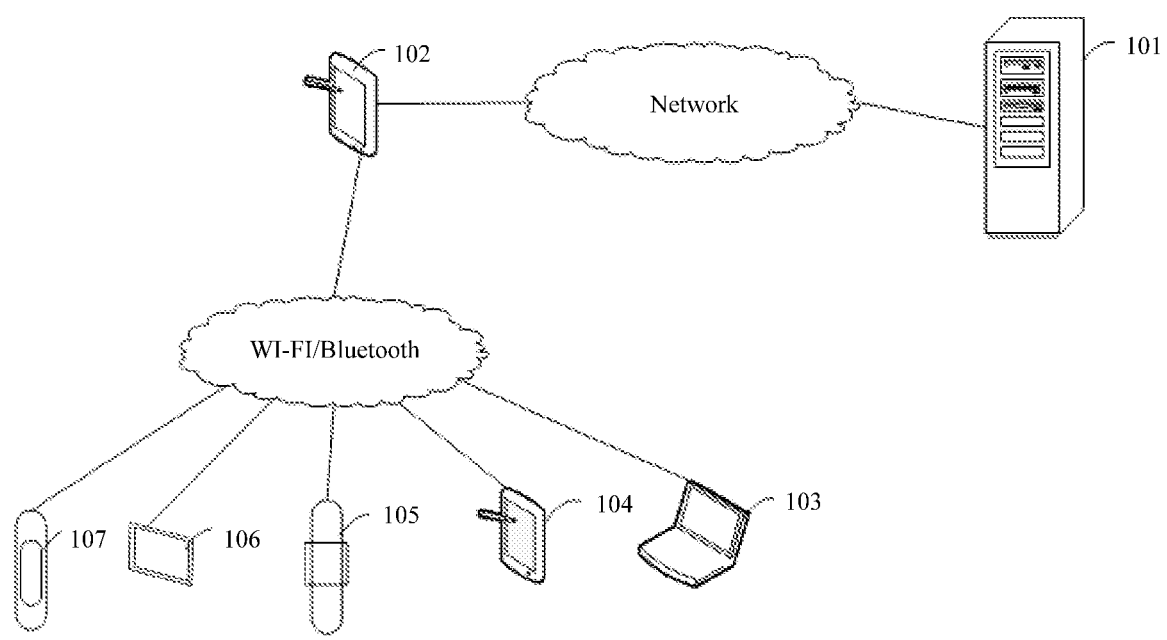
FIG. 1 is a diagram illustrating architecture of a communication system provided in an embodiment of the present disclosure.

FIG. 1 illustrates architecture of a communication system employed for the embodiments of the present disclosure. As illustrated in FIG. 1, the system architecture includes, for example, a server 101 and a terminal 102, and those search-detected including: a user's own laptop identifier 103, a colleague A's smartphone identifier 104, a colleague B's smart watch identifier 105, a colleague C's tablet identifier 106, and a colleague D's smart wristband identifier 107. A payment application can be installed on a terminal. Connections between the terminal and the server, or between the payment application and the server can be in a wired or wireless manner.

The server 101 can store resources that the payment application needs to access. The server 101 can be a network device for communicating with terminal devices. Main function modules of the server include a receiving module, a processing module, and a determining module. The receiving module is configured to receive user's account information and user's neighboring apparatus information transmitted by a terminal, and transmit these information to a user's information database, where the user's information database stores user's personal information, such as identifications (ID), mobile phone numbers, etc. The processing module is configured to establish a preset corresponding relationship between the terminal and a received neighboring apparatus identifier; bind the received neighboring apparatus identifier with corresponding user's personal information stored in the database; receive a current neighboring apparatus identifier of the terminal, and match the established preset corresponding relationship with a received current neighboring apparatus identifier to obtain an overall risk evaluation score of the current neighboring apparatus; and perform the payment process. The determining module is configured to determine an amount limit of a passwordless payment, according to the obtained overall risk evaluation score.

The terminal 102 may communicate with one or more core networks via Radio Access Network (RAN). The terminal can be a device provided with the payment application, a Bluetooth function or the ability to search for nearby wireless fidelity (WiFi) signals, or any other functions. The terminal can be a smartphone, a tablet, a handheld device with wireless communication capability, a computing device or other processing devices connected to a wireless modem, an on-board device and a wearable device connected to a wireless modem, a terminal device of a 5G network, etc. The terminal can search for identifiers of other neighboring apparatus, for example, using Bluetooth. The terminal can find a user's laptop identifier 103, a colleague A's smartphone identifier 104, a colleague B's smart watch identifier 105, a colleague C's tablet identifier 106, and a colleague D's smart wristband identifier 107 by search-detection. The terminal can transmit information to and from the server in a wireless or wired manner. The terminal can allow users to register information. The terminal can also respond to Bluetooth signals transmitted by other devices, where Bluetooth is a standard wireless communication protocol based on a low-cost transceiver chip of the device with short transmission distance and low power consumption. The terminal is connected to WiFi signals. WiFi is a technology that allows electronic devices to be connected to a Wireless Local Area Network (WLAN) and usually employs a 2.4G ultra high frequency (UHF) or 5G super high frequency industrial scientific medical (SHF ISM) radio frequency band with low power consumption and providing security. The payment application can be an application software (APP, Accelerated Parallel Processing).

Figure 2:
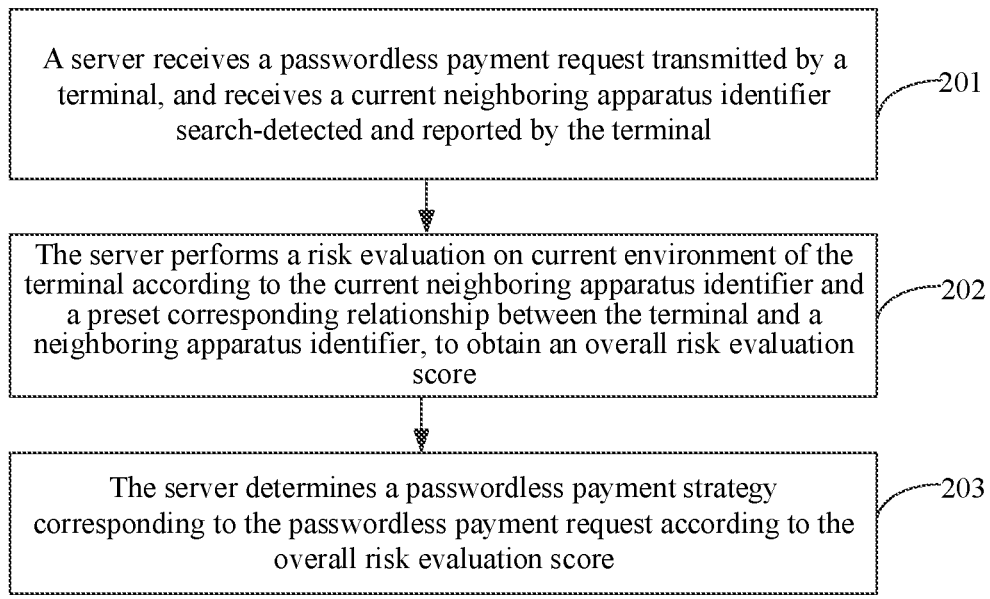
FIG. 2 is a flowchart illustrating a payment method provided in an embodiment of the present disclosure.

Based on the system architecture illustrated in FIG. 1, FIG. 2 illustrates a flowchart of an exemplary payment method provided in an embodiment of the present disclosure. As illustrated in FIG. 2, the payment method includes the following operations.

Operation 201: a server receives a passwordless payment request transmitted by a terminal, and receives a current neighboring apparatus identifier search-detected and reported by the terminal.

Operation 202: the server performs, a risk evaluation on a current environment of the terminal according to the current neighboring apparatus identifier and a preset corresponding relationship between the terminal and a neighboring apparatus identifier, to obtain an overall risk evaluation score.

Operation 203: the server determines a passwordless payment strategy corresponding to the passwordless payment request according to the overall risk evaluation score.

In the embodiment of the present disclosure, at first, the server performs, according to the received current neighboring apparatus identifier and the preset corresponding relationship between the terminal and a neighboring apparatus identifier, risk evaluation on the current environment of the terminal, to obtain the overall risk evaluation score, and then determines, according to the overall risk evaluation score, security of the current environment of the terminal, to determine the passwordless payment strategy corresponding to the passwordless payment request, thereby improving the convenience and security of passwordless payment.

Optionally, the preset corresponding relationship between the terminal and a neighboring apparatus identifier is obtained by training for a certain period of time, for example, for a week or a month. In one embodiment, a user downloads and installs a payment application on the terminal, then enters required personal information in the payment application to register as a user of the payment application, and enables a passwordless payment function. The terminal starts the Bluetooth or WiFi, monitors neighboring apparatus identifiers all the time, and uploads the found neighboring apparatus identifiers to the server in real time. The server determines a corresponding relationship between the terminal and a neighboring apparatus identifier according to the received apparatus identifiers transmitted by the terminal, for example, to obtain the preset corresponding relationship between the terminal and a neighboring apparatus identifier.

Optionally, the server receives the passwordless payment request transmitted by the terminal and the current neighboring apparatus identifier reported by the terminal. Optionally, the passwordless payment request and the current neighboring apparatus identifier are sent to the server simultaneously, or the passwordless payment request is sent first, followed by the current neighboring apparatus identifier, or the current neighboring apparatus identifier is sent first, followed by the passwordless payment request.

Optionally, after receiving the passwordless payment request transmitted from the terminal and the current neighboring apparatus identifier reported by the terminal, the server performs, according to the obtained preset corresponding relationship between the terminal and a neighboring apparatus identifier and the received current neighboring apparatus identifier, the risk evaluation on the current environment of the terminal and obtains an overall risk evaluation score.

Optionally, before the server performs the risk evaluation on the current environment of the terminal, according to the current neighboring apparatus identifier and the preset corresponding relationship between the terminal and a neighboring apparatus identifier, to obtain the overall risk evaluation score, the method further includes: the server determines a current time period corresponding to a time point when the terminal reports the current neighboring apparatus identifier, from a preset at least one time period; determines a corresponding relationship between the terminal and a neighboring apparatus identifier corresponding to the current time period, from a corresponding relationship between the terminal and a neighboring apparatus identifier corresponding to each time period of the preset at least one time period; and determines the corresponding relationship between the terminal and a neighboring apparatus identifier corresponding to the current time period, as the preset corresponding relationship between the terminal and a neighboring apparatus identifier.

Optionally, when determining the preset corresponding relationship between the terminal and a neighboring apparatus identifier, the server presets at least one time period, for example, preset time periods in the server are [8:00-12:00], [14:00-17:00], [20:00-22:00] in workdays, and [8:00-12:00], [14:00-17:00], [20:00-22:00] in rest days. Optionally, each time period has a corresponding relationship between the terminal and a neighboring apparatus identifier, for example, in the time period [8:00-12:00] of a workday, the corresponding relationship between the terminal and a neighboring apparatus identifier is that the terminal can search-detect a user's own laptop identifier 1, a colleague A's smartphone identifier 2, a colleague B's smart watch identifier 3, a colleague C's tablet identifier 4, and a colleague D's smart wristband identifier 5.

Optionally, during the time length of [20:00-22:00] at night, the found smart devices may be smart TVs, smart refrigerators, others' smartphones, laptops, etc., in the household.

Optionally, the corresponding relationship between the terminal and a neighboring apparatus identifier in different time periods under different scenarios of the workday or the rest day can be determined. The shorter the preset time period and the more detailed the scenario are, the closer the preset corresponding relationship between the terminal and a neighboring apparatus identifier in the server is to a real environment where the terminal is located.

Optionally, each time period of the at least one time period may have a time-overlap situation, for example, two time periods of [8:00-12:00] and [11:00-13:00] have an overlap situation; and in some embodiments, there is no time-overlap situation in the time periods.

Optionally, the operation that the server performs the risk evaluation on the current environment of the terminal, according to the current neighboring apparatus identifier, and the preset corresponding relationship between the terminal and a neighboring apparatus identifier, to obtain the overall risk evaluation score, includes: the server matches all neighboring apparatus identifiers in the preset corresponding relationship between the terminal and a neighboring apparatus identifier with the current neighboring apparatus identifier; determines the number of neighboring apparatus identifiers that successfully match with the current neighboring apparatus identifier and the number of neighboring apparatus identifiers that fail to match with the current neighboring apparatus identifier, from all the neighboring apparatus identifiers; and obtains the overall risk evaluation score, according to the number of neighboring apparatus identifiers that successfully match and the number of neighboring apparatus identifiers that fail to match.

Optionally, all neighboring apparatus identifiers in the preset corresponding relationship between the terminal and a neighboring apparatus identifier in the server include a user's own laptop identifier 1, colleague A's smartphone identifier 2, colleague B's smart watch identifier 3, colleague C's tablet identifier 4, and colleague D's smart wristband identifier 5. The current neighboring apparatus identifier reported by the terminal and received by the server includes the colleague A's smartphone identifier 2, the colleague B's smart watch identifier 3, and the colleague C's tablet identifier 4. The determined neighboring apparatus identifiers that match with the current neighboring apparatus identifier are the colleague A's smartphone identifier 2, the colleague B's smart watch identifier 3, and the colleague C's tablet identifier 4. It is further determined that the number of neighboring apparatus identifiers that successfully match is 3, and the number of neighboring apparatus identifiers that fail to match is 2. Then, the overall risk evaluation score is determined according to the number of neighboring apparatus identifiers that successfully match and the number of neighboring apparatus identifiers that fail to match.

Optionally, if none of the neighboring apparatus identifiers matches with the current neighboring apparatus identifier, the number of neighboring apparatus identifiers that match is zero, while the number of neighboring apparatus identifiers that mismatch is the total number of neighboring apparatus identifiers.

Optionally, before determining the corresponding relationship between the terminal and a neighboring apparatus identifier corresponding to the current time period, from the corresponding relationship between the terminal and a neighboring apparatus identifier corresponding to each time period of the preset at least one time period, the method further includes: for the corresponding relationship between the terminal and a neighboring apparatus identifier corresponding in each time period of the preset at least one time period, the server receives at least one neighboring apparatus identifier search-detected by the terminal and periodically reported by the terminal in the time period, and receives indication information indicating dwell time of a neighboring apparatus identified by each of the at least one neighboring apparatus identifier in the time period; and classifies the at least one neighboring apparatus identifier search-detected by the terminal in the time period as a number N of types of neighboring apparatus identifiers, according to the at least one neighboring apparatus identifier and the indication information, where N is an integer greater than or equal to 1, dwell times corresponding to all neighboring apparatus identifiers included in each of the number N of types of neighboring apparatus identifiers falls within a dwell time interval, and dwell time intervals respectively corresponding to two types of neighboring apparatus identifiers in the number N of types of neighboring apparatus identifiers are different.

Optionally, the sever receives at least one neighboring apparatus identifier search-detected and periodically reported by the terminal in the time period, and information indicating the dwell time of each neighboring apparatus identifier in the at least one neighboring apparatus identifier in the time period, for example, neighboring apparatus identifiers A and B detected by the terminal. Optionally, the neighboring apparatus identifier A is at least one apparatus identifier, and the neighboring apparatus identifier B is at least one apparatus identifier. In the case that the apparatus identifier A is monitored during the time period of [8:00-10:00], while the apparatus identifier 2 is monitored during the time period of [9:35-11:00], then the time period in which the terminal periodically reports the apparatus identifier A is [8:00-10:00] and the time period in which the terminal periodically reports the apparatus identifier B is [9:35-11:00]. Optionally, a duration that the terminal periodically reports the apparatus identifier A is 2 hours, and a duration that the terminal periodically reports the apparatus identifier B is 1.5 hours.

Optionally, a periodic report may include that the terminal reports the neighboring apparatus identifiers to the server every other hour on Mondays of workdays. The server updates the neighboring apparatus identifiers stored in the server according to the received neighboring apparatus identifiers periodically reported by the terminal, so that the neighboring apparatus identifiers of the user are closer to the most-recent neighboring apparatus identifiers of the terminal. Moreover, the longer the use, the closer to the current environment where the terminal is located; and the longer the use, the securer the passwordless payment, greatly improving the user experience.

Specific examples are given herein in detail for illustrative purposes. Each time period has a corresponding relationship between the terminal and a neighboring apparatus identifier, for example, in a time period [8:00-12:00] of workdays, the corresponding relationship between the terminal and a neighboring apparatus identifier is that the terminal search-detects a user's own laptop identifier 1, colleague A's smartphone identifier 2, colleague B's smart watch identifier 3, colleague C's tablet identifier 4, and colleague D's smart wristband identifier 5. It is counted that in the time period [8:00-12:00], the detected durations are 1 hour for the laptop identifier 1, 2 hours for the smartphone identifier 2, 3 hours for the smart watch identifier 3, 4 hours for the tablet identifier 4, and 3.5 hours for the smart wristband identifier 5, respectively. Then it can be determined that the connection duration of laptop identifier 1 accounts for 25% of the total time, the connection duration of smartphone identifier 2 accounts for 50% of the total time, the connection duration of smart watch identifier 3 accounts for 75% of the total time, the connection duration of tablet identifier 4 accounts for 100% of the total time, and the connection duration of smart wristband identifier 5 accounts for 87.5% of the total time. Optionally, according to an actual environment of the terminal, the at least one neighboring apparatus identifier detected is classified, for example, other terminals, detected by the terminal, falling within the time range of greater than or equal to 80% are classified as commonly used apparatuses, and those falling within the time range of 50%-80% are classified as average commonly used apparatuses. The commonly used apparatus identifiers are stored in a commonly used apparatus identifier list, including: the tablet identifier 4 and the smart wristband identifier 5; and the average commonly used apparatus identifiers are stored in an average commonly used apparatus identifier list, including: the smartphone identifier 2 and the smart watch identifier 3.

Optionally, the operation that the server performs the risk evaluation on the current environment of the terminal, according to the current neighboring apparatus identifier and a preset corresponding relationship between the terminal and a neighboring apparatus identifier, to obtain the overall risk evaluation score includes: the server determines a number N of types of neighboring apparatus identifiers corresponding to the terminal, from the preset corresponding relationship between the terminal and a neighboring apparatus identifier; matches each of the number N of types of neighboring apparatus identifiers with the current neighboring apparatus identifier; for each of the number N of types of neighboring apparatus identifiers, determines the number of neighboring apparatus identifiers that successfully match with the current neighboring apparatus identifier and a number of neighboring apparatus identifiers that fail to match with the current neighboring apparatus identifier, from the type of neighboring apparatus identifiers; and determines a risk evaluation score corresponding to the type of neighboring apparatus identifiers, according to a product of the number of neighboring apparatus identifiers that successfully match and a preset match success weight corresponding to the type of neighboring apparatus identifiers, and a product of the number of neighboring apparatus identifiers that fail to match and a preset match failure weight corresponding to the type of neighboring apparatus identifiers; and determines the overall risk evaluation score, at least according to number N of determined risk evaluation scores respectively corresponding to the number N of types of neighboring apparatus identifiers; where for each of the number N of types of neighboring apparatus identifiers, the longer the dwell time corresponding to the type of neighboring apparatus identifiers is, the greater the match success weight corresponding to the type of neighboring apparatus identifiers is, and the smaller the match failure weight corresponding to the type of neighboring apparatus identifiers is.

Optionally, the server determines, from the preset corresponding relationship between the terminal and a neighboring apparatus identifier, the number N of types of neighboring apparatus identifiers corresponding to the terminal; and the server matches each type of neighboring apparatus identifiers in the number N of types of neighboring apparatus identifiers with the current neighboring apparatus identifier.

Optionally, the number N of types of neighboring apparatus identifiers can be classified as the commonly used apparatus identifier list and the average commonly used apparatus identifier list. After receiving the current neighboring apparatus identifier, the server matches each type of neighboring apparatus identifiers in the number N of types of neighboring apparatus identifiers with the current neighboring apparatus identifier.

Optionally, weights of the number N of types of neighboring apparatus identifiers are determined, for example, it is determined that the weight of commonly used apparatus identifiers is 30 and the weight of average commonly used apparatus identifiers is 15.

For example, at 9:20 a.m. on a workday, a terminal transmits a payment request to a server. The server receives a current neighboring apparatus identifier transmitted from the terminal, for example, a smartphone identifier 2, a tablet identifier 4, and a smart wristband identifier 5, and determines a commonly used identifier list and an average commonly used identifier list in a duration corresponding to 9:20.

According to the above example illustrated in the time period [8:00-12:00] in the morning of Monday, it is determined that the commonly used apparatus identifier list includes the tablet identifier 4 and the smart wristband identifier 5; and the average commonly used apparatus identifier list includes the smartphone identifier 2 and the smart watch identifier 3. The server matches apparatus identifiers in the commonly used apparatus identifier list with the current neighboring apparatus identifier, finds out that the tablet identifier 4 and the smart wristband identifier 5 match with the current neighboring apparatus identifier, and determines that the number of apparatus identifiers that successfully match with the current neighboring apparatus identifier is 2 and the number of apparatus identifiers that fail to match with the current neighboring apparatus identifier is 1 in the commonly used apparatus identifier list. The weight of commonly used apparatus identifiers is 30, and then it is determined that a first risk evaluation score is 2*30+0*(−30)=60. In the average commonly used apparatus identifier list, the smartphone identifier 2 matches with the current neighboring apparatus identifier, and it is determined that the number of apparatus identifiers that successfully match with the current neighboring apparatus identifier is 1 and the number of apparatus identifiers that fail to match with the current neighboring apparatus identifier is 1 in the average commonly used apparatus identifier list. The weight of average commonly used apparatus identifiers is 15, and it is determined that a second risk evaluation score is 1*15+1*(−15)=0.

Optionally, the overall risk evaluation score is the sum of the first risk evaluation score and the second risk evaluation score, i.e., 60+0=60. Optionally, the risk evaluation score indicates the security of the current environment of the terminal, and the higher the overall risk evaluation score is, the securer the current environment is.

Optionally, the operation that the server determines the overall risk evaluation score, at least according to number N of determined risk evaluation scores respectively corresponding to the number N of types of neighboring apparatus identifiers includes: the server determines the number of neighboring apparatus identifiers that all-mismatch with the number N of types of neighboring apparatus identifiers, from the current neighboring apparatus identifier; determines a product of the number of neighboring apparatus identifiers that all-mismatch with the number N of types of neighboring apparatus identifiers and a preset all-mismatch weight; where the preset all-mismatch weight is greater than a match failure weight corresponding to each of the number N of types of neighboring apparatus identifiers; and determines a sum of the product of the number of neighboring apparatus identifiers that all-mismatch with the number N of types of neighboring apparatus identifiers and a preset all-mismatch weight, and number N of risk evaluation scores respectively corresponding to the number N of types of neighboring apparatus identifiers, to obtain the overall risk evaluation score.

Optionally, in the above example that the terminal transmits the payment request to the server at 9:20 a.m. on a workday, the server receives the current neighboring apparatus identifier transmitted from the terminal, that is, a smartphone identifier 2, a tablet identifier 4, a smart wristband identifier 5, and a new smartphone identifier 6. The server determines a commonly used apparatus identifier list including the tablet identifier 4 and the smart wristband identifier 5, and an average commonly used apparatus identifier list including the smartphone identifier 2 and the smart watch identifier 3, and determines that the first risk evaluation score is 2*30+0*(−30)=60, and the second risk evaluation score is 1*15+1*(−15)=0. The server determines that there is no identifier appearing in the commonly used apparatus identifier list and the average commonly used apparatus identifier list that matches with the new smartphone identifier 6, and determines that the number of apparatus identifiers that mismatch is 1.

Optionally, for example, the server determines, from the current neighboring apparatus identifier, that the weight of neighboring apparatus identifiers that all-mismatch with the number N of types of neighboring apparatus identifiers is 10, and then determines that a third risk evaluation score is 1*(−10)=−10; then the overall risk evaluation score is the sum of the first risk evaluation score, the second risk evaluation score and the third risk evaluation score, i.e., 2*30+0*(−30)+1*15+1*(−15)+1*(−10)=50.

Optionally, the higher the risk evaluation score, the securer the current environment. The environment with the risk evaluation score being 60 is securer than the environment with the risk evaluation score being 50; and in the case of the risk evaluation score being 50, compared to the preset corresponding relationship between the terminal and a neighboring apparatus identifier, the new smartphone identifier 6 shows up, and the new smartphone identifier 6 will bring a certain of security risks, so the risk evaluation score is lower.

Optionally, when the terminal is not in its routine environment, for example, when a mobile phone is stolen, or other unknown devices appear around the terminal, the payment of the terminal is at risk, but after the server performs risk evaluation on current neighboring apparatuses of the terminal, the server may obtain an overall risk evaluation score, thus determining whether the current environment of the terminal is secure, thereby improving the security of passwordless payment.

Optionally, the passwordless payment request includes an amount of payment; and the operation that the server determines the passwordless payment strategy corresponding to the passwordless payment request according to the overall risk evaluation score, includes: the server determines an amount limit of passwordless payment corresponding to the overall risk evaluation score; makes a payment according to the passwordless payment request, and returns a response message of a successful passwordless payment to the terminal, when determining that the amount of payment is not greater than the amount limit of passwordless payment; and returns a response message of unsuccessful passwordless payment to the terminal, when determining that the amount of payment is greater than the amount limit of passwordless payment.

The server determines the passwordless strategy according to the risk evaluation score. Optionally, the amount limit of passwordless payment is determined according to the overall risk evaluation score; detailed explanation is given with the following examples. According to the above method, it is determined that the risk evaluation score is 50, and the server determines that the amount limit of passwordless payment is, for example, 600 dollars when the risk evaluation score is 50. When the amount of payment in the payment request is 500 dollars, the server completes the payment and returns a response of successful payment to the terminal; when the amount of payment in the payment request is 800 dollars, the server returns a response of unsuccessful passwordless payment to the terminal. Optionally, the terminal pops up a password payment interface, and the payment request may be completed using password payment.

It should be noted that the above description of the distribution process for service requests is only for illustrative and explanatory purposes, and is not intended to limit the present disclosure.

Figure 3:
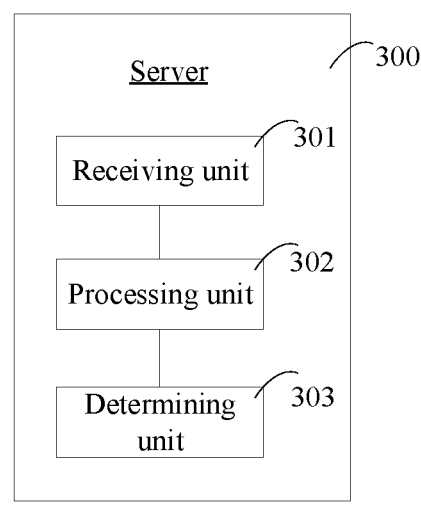
FIG. 3 is a block diagram illustrating a structure of a server provided in an embodiment of the present disclosure.

FIG. 3 is a block diagram illustrating a structure of a server provided in an embodiment of the present disclosure.

Based on the same or at least similar concept, the embodiment of the present disclosure provides a server. As illustrated in FIG. 3, the server 300 includes a receiving unit 301, a processing unit 302, and a determining unit 303.

The receiving unit is configured to receive a passwordless payment request transmitted by a terminal, and receive a current neighboring apparatus identifier search-detected and reported by the terminal.

The processing unit is configured to perform a risk evaluation on a current environment of the terminal, according to the current neighboring apparatus identifier and a preset corresponding relationship between the terminal and a neighboring apparatus identifier, to obtain an overall risk evaluation score.

The determining unit is configured to determine a passwordless payment strategy corresponding to the passwordless payment request according to the overall risk evaluation score.

Optionally, the processing unit is further configured to determine a current time period corresponding to a time point when the terminal reports the current neighboring apparatus identifier, from a preset at least one time period; determine a corresponding relationship between the terminal and a neighboring apparatus identifier corresponding to the current time period, from a corresponding relationship between the terminal and a neighboring apparatus identifier corresponding to each time period of the preset at least one time period; and determine the corresponding relationship between the terminal and a neighboring apparatus identifier corresponding to the current time period, as the preset corresponding relationship between the terminal and a neighboring apparatus identifier.

Optionally, the processing unit is configured to match all neighboring apparatus identifiers in the preset corresponding relationship between the terminal and a neighboring apparatus identifier with the current neighboring apparatus identifier; determine the number of neighboring apparatus identifiers that successfully match with the current neighboring apparatus identifier and the number of neighboring apparatus identifiers that fail to match with the current neighboring apparatus identifier, from all the neighboring apparatus identifiers; and obtain the overall risk evaluation score, according to the number of neighboring apparatus identifiers that successfully match and the number of neighboring apparatus identifiers that fail to match.

Optionally, the processing unit is further configured to, for the corresponding relationship between the terminal and a neighboring apparatus identifier corresponding to each time period of the preset at least one time period, perform: receiving at least one neighboring apparatus identifier detected and periodically reported by the terminal in the time period, and receiving indication information indicating dwell time of a neighboring apparatus identified by each of the at least one neighboring apparatus identifier in the time period; and classifying the at least one neighboring apparatus identifier detected by the terminal in the time period as number N of types of neighboring apparatus identifiers, according to the at least one neighboring apparatus identifier and the indication information.

N is an integer greater than or equal to 1, dwell times corresponding to all neighboring apparatus identifiers included in each of the number N of types of neighboring apparatus identifiers falls within a dwell time interval, and dwell time intervals respectively corresponding to two types of neighboring apparatus identifiers in the number N of types of neighboring apparatus identifiers are different.

Optionally, the determining unit is configured to determine number N of types of neighboring apparatus identifiers corresponding to the terminal, from the preset corresponding relationship between the terminal and a neighboring apparatus identifier; match each of the number N of types of neighboring apparatus identifiers with the current neighboring apparatus identifier; for each of the number N of types of neighboring apparatus identifiers, determine a number of neighboring apparatus identifiers that successfully match with the current neighboring apparatus identifier and the number of neighboring apparatus identifiers that fail to match with the current neighboring apparatus identifier, from the type of neighboring apparatus identifiers; determine a risk evaluation score corresponding to the type of neighboring apparatus identifiers, according to a product of the number of neighboring apparatus identifiers that successfully match and a preset match success weight corresponding to the type of neighboring apparatus identifiers, and a product of the number of neighboring apparatus identifiers that fail to match and a preset match failure weight corresponding to the type of neighboring apparatus identifiers; and determine the overall risk evaluation score, at least according to number N of determined risk evaluation scores respectively corresponding to the number N of types of neighboring apparatus identifiers.

For each of the number N of types of neighboring apparatus identifiers, the longer the dwell time corresponding to the type of neighboring apparatus identifiers is, the greater the match success weight corresponding to the type of neighboring apparatus identifiers is, and the smaller the match failure weight corresponding to the type of neighboring apparatus identifiers is.

Optionally, the processing unit is configured to determine the number of neighboring apparatus identifiers that all-mismatch with the number N of types of neighboring apparatus identifiers, from the current neighboring apparatus identifier; determine a product of the number of neighboring apparatus identifiers that all-mismatch with the number N of types of neighboring apparatus identifiers and a preset all-mismatch weight; where the preset all-mismatch weight is greater than a match failure weight corresponding to each of the number N of types of neighboring apparatus identifiers; and determine a sum of the product of the number of neighboring apparatus identifiers that all-mismatch with the number N of types of neighboring apparatus identifiers and a preset all-mismatch weight, and number N of risk evaluation scores respectively corresponding to the number N of types of neighboring apparatus identifiers, to obtain the overall risk evaluation score.

Optionally, the passwordless payment request includes the amount of payment.

Optionally, the determining unit is configured to determine an amount limit of passwordless payment corresponding to the overall risk evaluation score.

Optionally, the processing unit is configured to make a payment according to the passwordless payment request, and return a response message of successful passwordless payment to the terminal, upon determining that the amount of payment is not greater than the amount limit of passwordless payment; and return a response message of unsuccessful passwordless payment to the terminal, upon determining that the amount of payment is greater than the amount limit of passwordless payment.

Figure 4:
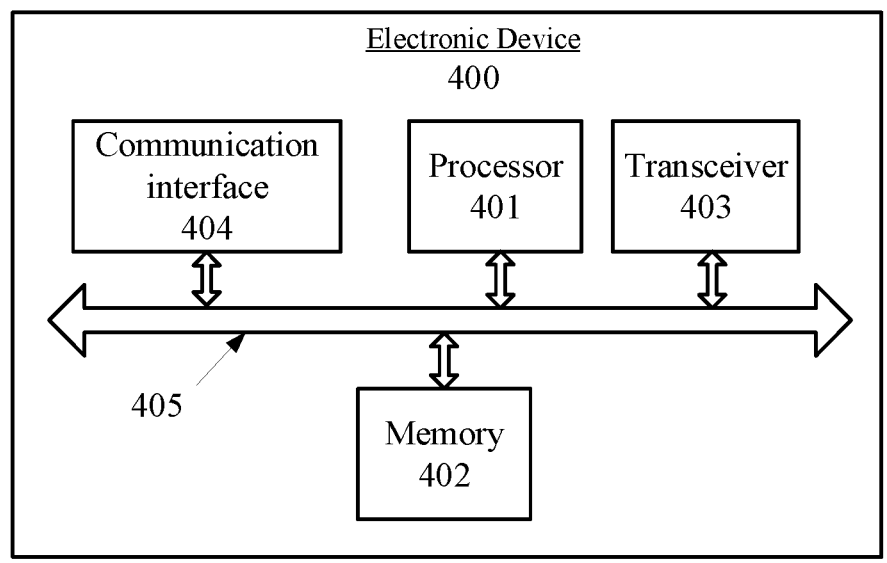
FIG. 4 is a block diagram illustrating a structure of an electronic device provided in an embodiment of the present disclosure.

Based on the same or at least similar concept, the present disclosure provides an electronic device that can be used to perform the disclosed methods. FIG. 4 is a block diagram illustrating a structure of an electronic device provided in the present disclosure. The electronic device includes a processor 401, a memory 402, a transceiver 403 and a communication interface 404; where the processor 401, the memory 402, the transceiver 403 and the communication interface 404 are interconnected via a bus 405.

The bus 405 may be either a peripheral component interconnect (PCI) bus or an extended industry standard architecture (EISA) bus, etc. The bus can be divided into an address bus, a data bus, a control bus, etc. For ease of expression, the bus is illustrated in FIG. 4 only with a bold line, yet it does not mean that there is only one bus or one type of bus.

The memory 402 includes a volatile memory, such as a random-access memory (RAM); the memory may also include a non-volatile memory, such as a flash memory, a hard disk drive (HDD) or a solid-state drive (SSD); the memory 402 may also include a combination of the above types of memory.

The communication interface 404 can be either a wired communication interface or a wireless communication interface, or a combination thereof, where the wired communication interface can be, for example, an Ethernet interface. The Ethernet interface can be an optical interface, an electrical interface, or a combination thereof. The wireless communication interface can be a WLAN interface.

The processor 401 can be a central processing unit (CPU), a network processor (NP) or a combination of CPU and NP.

The processor 401 may further include a hardware chip. The hardware chip may be either an application-specific integrated circuit (ASIC) or a programmable logic device (PLD), or a combination thereof. The PLD may be a complex programmable logic device (CPLD), a field-programmable gate array (FPGA), a generic array logic (GAL), or any combination thereof.

The processor 401 is configured to read a program stored in the memory 402 and execute: performing, according to a current neighboring apparatus identifier and a preset corresponding relationship between a terminal and a neighboring apparatus identifier, a risk evaluation on the current environment of the terminal, to obtain an overall risk evaluation score; and determining, according to the overall risk evaluation score, a passwordless payment strategy corresponding to a passwordless payment request.

The memory 402 is configured to store one or more executable programs, and can store data used by the processor 401 during performing operations.

The transceiver 403 is configured to receive the passwordless payment request transmitted from the terminal under the control of the processor 401; and receive the current neighboring apparatus identifier search-detected and reported by the terminal.

Optionally, the processor is further configured to determine a current time period corresponding to time when the terminal reports the current neighboring apparatus identifier, from preset at least one time period; determine a corresponding relationship between the terminal and a neighboring apparatus identifier corresponding to the current time period, from a corresponding relationship between the terminal and a neighboring apparatus identifier corresponding to each time period of the preset at least one time period; and determine the corresponding relationship between the terminal and a neighboring apparatus identifier, corresponding to the current time period, as the preset corresponding relationship between the terminal and a neighboring apparatus identifier.

Optionally, the processor is configured to match all neighboring apparatus identifiers in the preset corresponding relationship between the terminal and a neighboring apparatus identifier with the current neighboring apparatus identifier; determine the number of neighboring apparatus identifiers that successfully match with the current neighboring apparatus identifier and the number of neighboring apparatus identifiers that fail to match with the current neighboring apparatus identifier, from all the neighboring apparatus identifiers; and obtain the overall risk evaluation score according to the number of neighboring apparatus identifiers that successfully match and the number of neighboring apparatus identifiers that fail to match.

Optionally, for the corresponding relationship between the terminal and a neighboring apparatus identifier corresponding to each time period of the preset at least one time period, the processor is further configured to: receive at least one neighboring apparatus identifier search-detected and periodically reported by the terminal in the time period, and receive indication information indicating dwell time of a neighboring apparatus identified by each of the at least one neighboring apparatus identifier in the time period; and classify the at least one neighboring apparatus identifier detected by the terminal in the time period as number N types of neighboring apparatus identifiers, according to the at least one neighboring apparatus identifier and the indication information.

N is an integer greater than or equal to 1, dwell times corresponding to all neighboring apparatus identifiers included in each of the number N of types of neighboring apparatus identifiers falls within a dwell time interval, and dwell time intervals respectively corresponding to two types of neighboring apparatus identifiers in the number N of types of neighboring apparatus identifiers are different.

Optionally, the processor is configured to determine number N of types of neighboring apparatus identifiers corresponding to the terminal, from the preset corresponding relationship between the terminal and a neighboring apparatus identifier; match each of the number N of types of neighboring apparatus identifiers with the current neighboring apparatus identifier; for each of the number N of types of neighboring apparatus identifiers, determine, by the server, the number of neighboring apparatus identifiers that successfully match with the current neighboring apparatus identifier and the number of neighboring apparatus identifiers that fail to match with the current neighboring apparatus identifier, from the type of neighboring apparatus identifiers; determine a risk evaluation score corresponding to the type of neighboring apparatus identifiers, according to a product of the number of neighboring apparatus identifiers that successfully match and a preset match success weight corresponding to the type of neighboring apparatus identifiers, and a product of the number of neighboring apparatus identifiers that fail to match and a preset match failure weight corresponding to the type of neighboring apparatus identifiers; and determine the overall risk evaluation score, at least according to number N of determined risk evaluation scores respectively corresponding to the number N of types of neighboring apparatus identifiers.

For each of the number N of types of neighboring apparatus identifiers, the longer the dwell time corresponding to the type of neighboring apparatus identifiers is, the greater the match success weight corresponding to the type of neighboring apparatus identifiers is, and the smaller the match failure weight corresponding to the type of neighboring apparatus identifiers is.

Optionally, the processor is configured to determine, the number of neighboring apparatus identifiers that all-mismatch with the number N of types of neighboring apparatus identifiers, from the current neighboring apparatus identifier; determine a product of the number of neighboring apparatus identifiers that all-mismatch with the number N of types of neighboring apparatus identifiers and a preset all-mismatch weight; where the preset all-mismatch weight is greater than a match failure weight corresponding to each of the number N of types of neighboring apparatus identifiers; and determine a sum of the product of the number of neighboring apparatus identifiers that all-mismatch with the number N of types of neighboring apparatus identifiers and a preset all-mismatch weight, and number N of risk evaluation scores respectively corresponding to the number N of types of neighboring apparatus identifiers, to obtain the overall risk evaluation score.

Optionally, the passwordless payment request includes an amount of payment.

Optionally, the processor is configured to determine an amount limit of passwordless payment corresponding to the overall risk evaluation score.

Optionally, the processor is configured to make a payment according to the passwordless payment request, and return a response message of successful passwordless payment to the terminal upon determining that the amount of payment is not greater than the amount limit of passwordless payment; and return a response message of unsuccessful passwordless payment to the terminal upon determining that the amount of payment is greater than the amount limit of passwordless payment.

It should be understood that the division of each unit is only a division of logical functions, which can be integrated into a physical entity in whole or in part, or separated physically in the actual implementation. In the embodiment of the present disclosure, the function of the receiving unit 301 can be implemented by a transceiver, and the functions of the processing unit 302 and the determining unit 303 can be implemented by a processor.

As illustrated in FIG. 4, the electronic device 400 may include a processor 401, a transceiver 403, and a memory 402, where, the memory 402 can be used to store pre-installed program/code when the electronic device 400 leaves the factory, and can also store code used when the processor 401 works, etc.

It can be seen from the foregoing that, in the embodiment of the present disclosure, at first, the server performs, according to the received current neighboring apparatus identifier and the preset corresponding relationship between the terminal and a neighboring apparatus identifier, the risk evaluation on the current environment of the terminal, to obtain the overall risk evaluation score, and then determines, according to the overall risk evaluation score, security of the current environment of the terminal, to determine the passwordless payment strategy corresponding to the passwordless payment request, thereby improving the convenience and security of passwordless payment.

It should be understood by those skilled in the art that embodiments of the present disclosure can be provided as methods, or computer program products. Accordingly, the present disclosure may take the form of complete hardware embodiments, complete software embodiments, or embodiments combining the software with hardware aspects. Moreover, the present disclosure can take the form of a computer program product embodied on one or more computer available storage media (including but not limited to disk storage, CD-ROM, optical storage, etc.), which contain computer available program code.

The present disclosure is described with reference to the flowchart and/or block diagram of methods, devices (systems), and computer program products according to embodiments of the present disclosure. It should be understood that each flow and/or each block, as well as the combination thereof in the flowchart and/or the block diagram can be implemented by computer program instructions. These computer program instructions can be provided for processors of a general computer, a special computer, an embedded processor, or other programmable data processing devices to produce a machine to enable instructions executed by processors of computers or other programmable data processing devices to generate devices for implementing the functions specified in one or more flows in the flowchart and/or one or more blocks in the block diagram.

These computer program instructions can also be stored in a computer readable memory that can direct a computer or other programmable data processing device to operate in a particular manner, such that the instructions stored in the computer readable memory can generate manufactured products, including an instruction device which implements the functions specified in one or more flows in the flowchart and/or one or more blocks in the block diagram.

These computer program instructions can also be loaded onto a computer or other programmable data processing device, allowing a series of operational steps to be performed on a computer or other programmable device to achieve the computer processing, so that instructions executed on a computer or other programmable device can be used to implement steps with the functions specified in one or more flows in the flowchart and/or one or more blocks in the block diagram.

Although preferred embodiments of the present disclosure have been described, it should be understood that those skilled in the art can make additional changes and modifications to these embodiments once they become aware of the basic creative concepts. Therefore, the appended claims are intended to be interpreted as including the preferred embodiments together with all changes and modifications falling within the scope of the present disclosure.

It is apparent that those skilled in the art can make various changes and modifications to the present disclosure without departing from the spirit and scope of the present disclosure. Thus, such changes and modifications are intended to be included within the scope of the present disclosure if these changes and modifications fall within the scope of the claims of the present disclosure and their equivalents.

The invention claimed is:

1. A payment method implemented by a server, comprising:
receiving, in each of multiple recurring time periods, at least one neighboring apparatus identifier search-detected and reported by a terminal, the terminal including a communication interface configured to search and detect a neighboring apparatus according to a communication protocol, each neighboring apparatus identifier indicating an apparatus locally connected with the terminal, existing in a same local network as the terminal, or existing within a detectable range of the terminal;
establishing multiple corresponding relationships, each corresponding relationship indicating a correspondence between the terminal and the at least one neighboring apparatus identifier in one time period of the multiple recurring time periods;
for each corresponding relationship in the one time period:
receiving indication information indicating a dwell time of a neighboring apparatus identified by each of the at least one neighboring apparatus identifier in the one time period;
classifying the at least one neighboring apparatus identifier search-detected by the terminal in the one time period into a quantity N of types of neighboring apparatus identifiers, according to the at least one neighboring apparatus identifier and the indication information; wherein, N is positive integer, dwell times corresponding to all neighboring apparatus identifiers included in each of the quantity N of types of neighboring apparatus identifiers falls within a dwell time interval, and dwell time intervals respectively corresponding to two types of neighboring apparatus identifiers in the quantity N of types of neighboring apparatus identifiers are different;

receiving a passwordless payment request transmitted by the terminal;

receiving a current neighboring apparatus identifier search-detected and reported by the terminal;

determining a current time period corresponding to a time point when the terminal reports the current neighboring apparatus identifier;

determining, from the multiple corresponding relationships, a preset corresponding relationship between the terminal and at least one first neighboring apparatus identifier of a first time period that matches the current time period;

obtaining an overall risk evaluation score by performing a risk evaluation on a current environment of the terminal, according to the current neighboring apparatus identifier and the preset corresponding relationship between the terminal and the at least one first neighboring apparatus identifier, comprising:

matching each of the quantity N of types of neighboring apparatus identifiers with the current neighboring apparatus identifier;

for each of the quantity N of types of neighboring apparatus identifiers, determining a quantity of neighboring apparatus identifiers that successfully match with the current neighboring apparatus identifier and a quantity of neighboring apparatus identifiers that fail to match with the current neighboring apparatus identifier, from the type of neighboring apparatus identifiers; and determining a risk evaluation score corresponding to the type of neighboring apparatus identifiers, according to a product of the quantity of neighboring apparatus identifiers that successfully match and a preset match success weight corresponding to the type of neighboring apparatus identifiers, and a product of the quantity of neighboring apparatus identifiers that fail to match and a preset match failure weight corresponding to the type of neighboring apparatus identifiers; and determining the overall risk evaluation score, at least according to a quantity N of determined risk evaluation scores respectively corresponding to the quantity N of types of neighboring apparatus identifiers, wherein, for each of the quantity N of types of neighboring apparatus identifiers, the longer the dwell time corresponding to the type of neighboring apparatus identifiers is, the greater the match success weight corresponding to the type of neighboring apparatus identifiers is, and the smaller the match failure weight corresponding to the type of neighboring apparatus identifiers is; and determining a passwordless payment strategy corresponding to the passwordless payment request according to the overall risk evaluation score.

2. The method according to claim 1, wherein the determining the overall risk evaluation score, at least according to the quantity N of determined risk evaluation scores respectively corresponding to the quantity N of types of neighboring apparatus identifiers comprises:

determining, by the server, a quantity of neighboring apparatus identifiers that all-mismatch with the quantity N of types of neighboring apparatus identifiers, from the current neighboring apparatus identifier;

determining, by the server, a product of the quantity of neighboring apparatus identifiers that all-mismatch with the quantity N of types of neighboring apparatus identifiers and a preset all-mismatch weight; wherein the preset all-mismatch weight is greater than a match failure weight corresponding to each of the quantity N of types of neighboring apparatus identifiers; and determining, by the server, a sum of the product of the quantity of neighboring apparatus identifiers that all-mismatch with the quantity N of types of neighboring apparatus identifiers and a preset all-mismatch weight, and a quantity N of risk evaluation scores respectively corresponding to the quantity N of types of neighboring apparatus identifiers, to obtain the overall risk evaluation score.

3. The method according to claim 1, wherein the passwordless payment request comprises an amount of payment; and the determining, by the server, the passwordless payment strategy corresponding to the passwordless payment request according to the overall risk evaluation score, comprises:

determining, by the server, an amount limit of passwordless payment corresponding to the overall risk evaluation score;

making, by the server, a payment according to the passwordless payment request, and returning a response message of successful passwordless payment to the terminal, when determining that the amount of payment is not greater than the amount limit of passwordless payment; and returning, by the server, a response message of unsuccessful passwordless payment to the terminal, when determining that the amount of payment is greater than the amount limit of passwordless payment.

4. An electronic device, comprising a processor, a memory, a transceiver, and a communication interface, wherein the processor, the memory and the transceiver are interconnected by a bus;

the transceiver is configured to receive, in each of multiple recurring time periods, at least one neighboring apparatus identifier search-detected and reported by a terminal, the terminal including a communication interface configured to search and detect a neighboring apparatus according to a communication protocol, each neighboring apparatus identifier indicating an apparatus locally connected with the terminal, existing in a same local network as the terminal, or existing within a detectable range of the terminal;

the processor is configured to read a program stored in the memory and execute following operations:

establishing multiple corresponding relationships, each corresponding relationship indicating a correspondence between the terminal and the at least one neighboring apparatus identifier in one time period of the multiple recurring time periods;

for each corresponding relationship in the one time period:

receiving indication information indicating a dwell time of a neighboring apparatus identified by each of the at least one neighboring apparatus identifier in the one time period;

classifying the at least one neighboring apparatus identifier search-detected by the terminal in the one time period into a quantity N of types of neighboring apparatus identifiers, according to the at least one neighboring apparatus identifier and the indication information; wherein, N is positive integer, dwell times corresponding to all neighboring apparatus identifiers included in each of the quantity N of types of neighboring apparatus identifiers falls within a dwell time interval, and dwell time intervals respectively corresponding to two types of neighboring apparatus identifiers in the quantity N of types of neighboring apparatus identifiers are different;

determining a current time period corresponding to a time point when the terminal reports the current neighboring apparatus identifier;

determining, from the multiple corresponding relationships, a preset corresponding relationship between the terminal and at least one first neighboring apparatus identifier of a first time period that matches the current time period;

obtaining an overall risk evaluation score by performing a risk evaluation on a current environment of the terminal, according to a current neighboring apparatus identifier, and the preset corresponding relationship between the terminal and the at least one first neighboring apparatus identifier, comprising:

matching each of the quantity N of types of neighboring apparatus identifiers with the current neighboring apparatus identifier;

for each of the quantity N of types of neighboring apparatus identifiers, determining a quantity of neighboring apparatus identifiers that successfully match with the current neighboring apparatus identifier and a quantity of neighboring apparatus identifiers that fail to match with the current neighboring apparatus identifier, from the type of neighboring apparatus identifiers; and determining a risk evaluation score corresponding to the type of neighboring apparatus identifiers, according to a product of the quantity of neighboring apparatus identifiers that successfully match and a preset match success weight corresponding to the type of neighboring apparatus identifiers, and a product of the quantity of neighboring apparatus identifiers that fail to match and a preset match failure weight corresponding to the type of neighboring apparatus identifiers; and determining the overall risk evaluation score, at least according to a quantity N of determined risk evaluation scores respectively corresponding to the quantity N of types of neighboring apparatus identifiers, wherein, for each of the quantity N of types of neighboring apparatus identifiers, the longer the dwell time corresponding to the type of neighboring apparatus identifiers is, the greater the match success weight corresponding to the type of neighboring apparatus identifiers is, and the smaller the match failure weight corresponding to the type of neighboring apparatus identifiers is; and determining a passwordless payment strategy corresponding to a passwordless payment request, according to the overall risk evaluation score;

the transceiver is configured to receive the passwordless payment request transmitted by the terminal, and receive the current neighboring apparatus identifier search-detected and reported by the terminal; and the memory is configured to store one or more executable programs and store data used by the processor during performing the operations.

5. The electronic device according to claim 4, wherein the processor is configured to:

determine, a quantity of neighboring apparatus identifiers that all-mismatch with the quantity N of types of neighboring apparatus identifiers, from the current neighboring apparatus identifier; determine a product of the quantity of neighboring apparatus identifiers that all-mismatch with the quantity N of types of neighboring apparatus identifiers and a preset all-mismatch weight; wherein the preset all-mismatch weight is greater than a match failure weight corresponding to each of the quantity N of types of neighboring apparatus identifiers; and determine a sum of the product of the quantity of neighboring apparatus identifiers that all-mismatch with the quantity N of types of neighboring apparatus identifiers and a preset all-mismatch weight, and quantity N of risk evaluation scores respectively corresponding to the quantity N of types of neighboring apparatus identifiers, to obtain the overall risk evaluation score.

6. The electronic device according to claim 4, wherein the passwordless payment request comprises an amount of payment; and the processor is configured to determine an amount limit of passwordless payment corresponding to the overall risk evaluation score; make a payment according to the passwordless payment request, and return a response message of successful passwordless payment to the terminal when determining that the amount of payment is not greater than the amount limit of passwordless payment; and return a response message of unsuccessful passwordless payment to the terminal when determining that the amount of payment is greater than the amount limit of passwordless payment.

7. A non-transitory computer-readable storage medium, storing computer instructions that, when being executed by a computer, cause the computer to execute a plurality of operations comprising:

receiving, in each of multiple recurring time periods, at least one neighboring apparatus identifier search-detected and reported by a terminal, the terminal including a communication interface configured to search and detect a neighboring apparatus according to a communication protocol, each neighboring apparatus identifier indicating an apparatus locally connected with the terminal, existing in a same local network as the terminal, or existing within a detectable range of the terminal;

establishing multiple corresponding relationships, each corresponding relationship indicating a correspondence between the terminal and the at least one neighboring apparatus identifier in one time period of the multiple recurring time periods;

for each corresponding relationship in the one time period:

receiving indication information indicating a dwell time of a neighboring apparatus identified by each of the at least one neighboring apparatus identifier in the one time period;

classifying the at least one neighboring apparatus identifier search-detected by the terminal in the one time period into a quantity N of types of neighboring apparatus identifiers, according to the at least one neighboring apparatus identifier and the indication information; wherein, N is positive integer, dwell times corresponding to all neighboring apparatus identifiers included in each of the quantity N of types of neighboring apparatus identifiers falls within a dwell time interval, and dwell time intervals respectively corresponding to two types of neighboring apparatus identifiers in the quantity N of types of neighboring apparatus identifiers are different;

receiving a passwordless payment request transmitted by the terminal;

receiving a current neighboring apparatus identifier search-detected and reported by the terminal;

determining a current time period corresponding to a time point when the terminal reports the current neighboring apparatus identifier;

determining, from the multiple corresponding relationships, a preset corresponding relationship between the terminal and at least one first neighboring apparatus identifier of a first time period that matches the current time period;

obtaining an overall risk evaluation score by performing a risk evaluation on a current environment of the terminal, according to the current neighboring apparatus identifier and the preset corresponding relationship between the terminal and the at least one first neighboring apparatus identifier, comprising:

matching each of the quantity N of types of neighboring apparatus identifiers with the current neighboring apparatus identifier;

for each of the quantity N of types of neighboring apparatus identifiers, determining a quantity of neighboring apparatus identifiers that successfully match with the current neighboring apparatus identifier and a quantity of neighboring apparatus identifiers that fail to match with the current neighboring apparatus identifier, from the type of neighboring apparatus identifiers; and determining a risk evaluation score corresponding to the type of neighboring apparatus identifiers, according to a product of the quantity of neighboring apparatus identifiers that successfully match and a preset match success weight corresponding to the type of neighboring apparatus identifiers, and a product of the quantity of neighboring apparatus identifiers that fail to match and a preset match failure weight corresponding to the type of neighboring apparatus identifiers; and determining the overall risk evaluation score, at least according to a quantity N of determined risk evaluation scores respectively corresponding to the quantity N of types of neighboring apparatus identifiers, wherein, for each of the quantity N of types of neighboring apparatus identifiers, the longer the dwell time corresponding to the type of neighboring apparatus identifiers is, the greater the match success weight corresponding to the type of neighboring apparatus identifiers is, and the smaller the match failure weight corresponding to the type of neighboring apparatus identifiers is; and determining a passwordless payment strategy corresponding to the passwordless payment request according to the overall risk evaluation score.

\* \* \* \* \*